Aug. 7, 1945.   R. A. HRABAK   2,381,450
ULTRAVIOLET STERILIZER
Filed Jan. 2, 1943   2 Sheets-Sheet 1
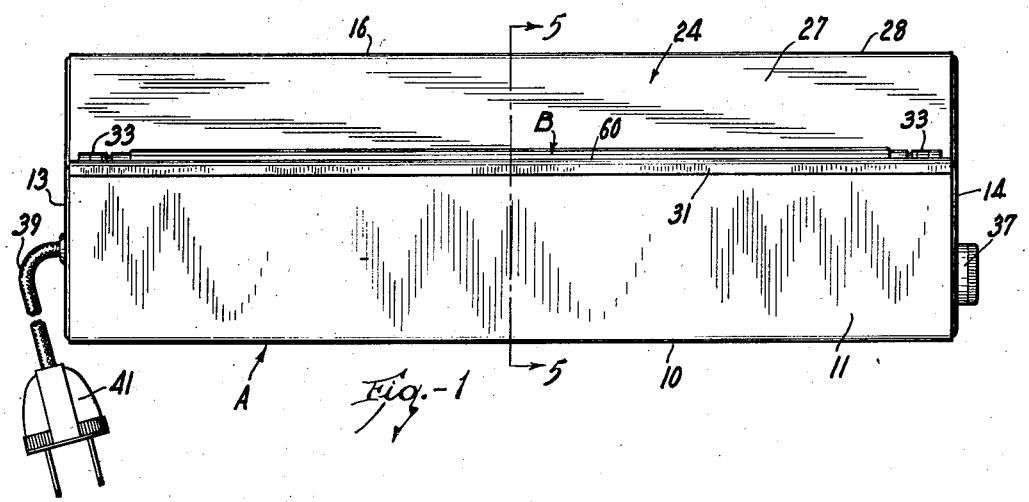
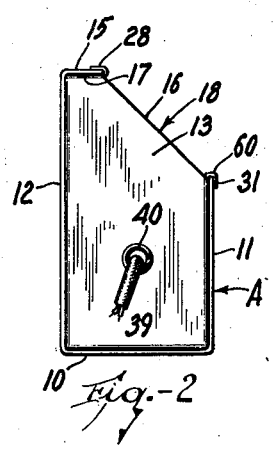
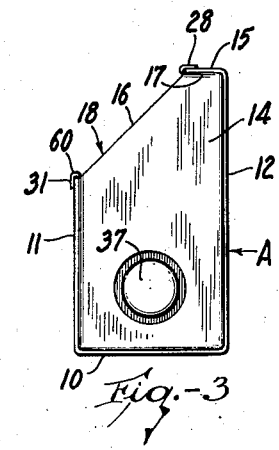
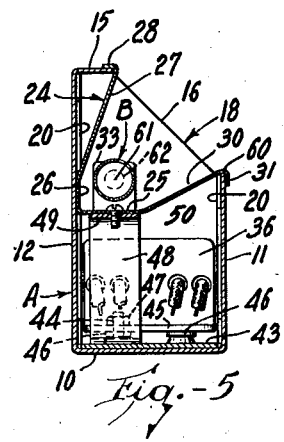
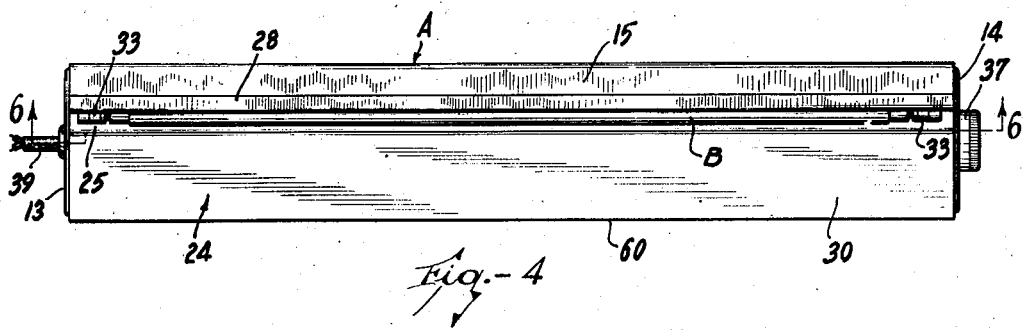
INVENTOR
ROBERT A. HRABAK
BY Hyde and Meyer.
ATTORNEYS Aug. 7, 1945.   R. A. HRABAK   2,381,450
ULTRAVIOLET STERILIZER
Filed Jan. 2, 1943   2 Sheets-Sheet 2

INVENTOR
ROBERT A. HRABAK
BY Hyde and Meyer
ATTORNEYS

Patented Aug. 7, 1945

2,381,450

UNITED STATES PATENT OFFICE 2,381,450

ULTRAVIOLET STERILIZER

Robert A. Hrabak, Lakewood, Ohio, assignor to The Art Metal Company, Cleveland, Ohio, a corporation of Ohio Application January 2, 1943, Serial No. 471,192

4 Claims. (Cl. 250—88)

This invention relates to ultraviolet sterilizers, and while devices embodying the present invention are suitable for various sterilizing purposes, such devices are particularly useful in effecting air sterilization or sanitary ventilation.

It is now an accepted fact that ultraviolet radiations, particularly in the spectral range 2000 to 3000 Angstrom units, are quite effective in killing bacteria of disease-carrying species. Although ultraviolet radiations within the aforesaid germicidal range form a fractional part of the invisible spectrum originating in the sun, such radiations are largely absorbed in the upper layers of the earth's atmosphere. Inasmuch as extended or prolonged exposure to ultraviolet radiations of germicidal frequency are injurious to the human system, especially to the skin and eyes, it is perhaps fortunate that the sun's germicidal ultraviolet radiations are largely absorbed by the earth's atmosphere. However, lamps for artificially generating ultraviolet radiations of germicidal frequency are now available, lamps which are of conveniently sized tube form, of low operating cost and which are operative from ordinary alternating electric circuits. A substantial proportion of the output of such lamps is ultraviolet energy at a resonance radiation of 2537A, which is not far removed from the preferred germicidal radiation of approximately 2650A.

The present invention has for one of its objects the provision of an ultraviolet sterilizer in which is used a lamp of the aforesaid character, said sterilizer having simple and inexpensive means for supporting the ultraviolet lamp, for enclosing the associated parts necessary for the operation of said lamp, and for efficiently directing to the desired regions, for effective sterilizing purposes, the ultraviolet radiations emitted by said lamp.

A further object of the present invention is the provision of an ultraviolet sterilizer which, when horizontally mounted on a suitable support, such as a wall of a room or chamber, directs to the region above the ultraviolet generating zone of the lamp of said sterilizer all ultraviolet radiations emitted by such lamp. Therefore, by mounting said sterilizer at a height above that of any standing occupants of said room or chamber, say at a height of seven feet, the ultraviolet lamp of said sterilizer is concealed from view, with the consequent avoidance of any direct exposure of said occupants to the ultraviolet radiations emanating from said lamp.

A further object of the present invention is the provision of an ultraviolet sterilizer having structural and manufacturing simplicity, parts which can be readily and conveniently assembled, and which possesses high operating efficiency.

The present invention will be readily understood and many of its practical advantages will be evident from the following description of one embodiment of such invention, reference being had to the accompanying drawings, in which Fig. 1 is a front elevational view of an ultraviolet sterilizer constructed in accordance with such embodiment of the invention;

Fig. 2 is a left end elevational view of said sterilizer;

Fig. 3 is a right end elevational view thereof;

Fig. 4 is a top plan view thereof;

Fig. 5 is a cross-sectional view of the sterilizer, on the line 5—5, Fig. 1;

Figure 6:
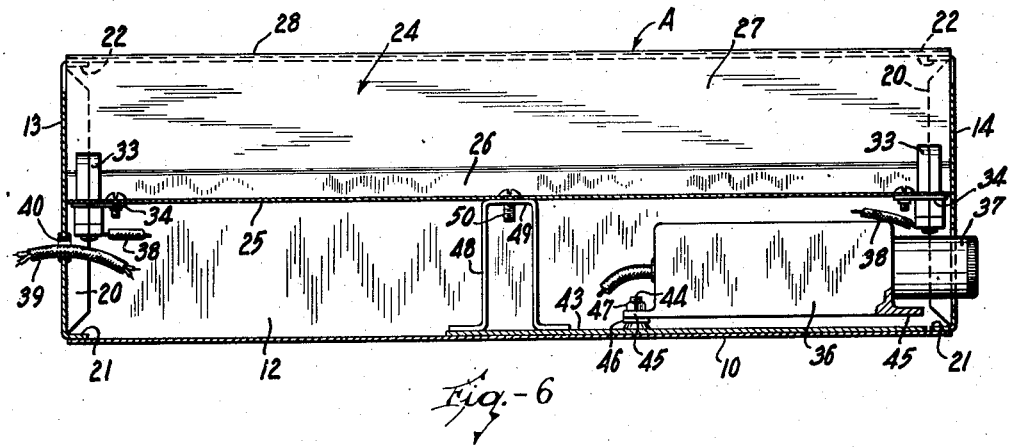
Fig. 6 is a vertical longitudinal sectional view, on the line 6—6, Fig. 4, the ultraviolet lamp of the sterilizer being omitted.

Before the air sterilizer here illustrated is described in detail, it is to be understood that the invention here involved is not limited to the details of construction or the specific arrangement of parts herein illustrated or described, as the invention obviously may take other forms. It also is to be understood that the phraseology or terminology herein employed is for the purpose of description and not of limitation, the scope of the present invention being denoted by the appended claims.

As will be evident from the accompanying drawings, the ultraviolet sterilizer here illustrated, for the disclosure of one form of the present invention, comprising a box-like structure A of any suitable material, such as sheet metal, and of any suitable size and shape. Generally speaking, the size of the housing A is controlled by the size of the ultraviolet lamp to be mounted therein, an eight watt lamp, for example, being substantially two-thirds as long as a fifteen watt lamp. Merely for purposes of illustration, the lamp B of the present sterilizer is an eight watt lamp of the usual cylindrical tube form, and the housing A is therefore of a length and width to properly receive said lamp and its reflector and to enclose the parts necessary for the operation of the lamp, as will hereafter more fully appear. Inasmuch as the lamp B forms no part, per se, of the present invention, it is sufficient to here state that the lamp is of the hot cathode, low voltage tube type, the mercury arc discharge of which is the source of the ultraviolet radiations. The cylindrical wall of the lamp is of glass having special wave transmitting characteristics, and the metal end caps of the lamp are provided with the usual paired and longitudinally disposed contact prongs not here illustrated.

As here shown, the box-like housing A comprises a flat rectangular base 10, upright front and rear walls 11 and 12 coextensive in length with said base, and a pair of upright end walls 13 and 14. As best shown in Figs. 2, 3 and 5, the rear wall 12 is of materially greater height than that of the front wall 11, and is provided at its top or upper edge with a forwardly extending full length flange 15 substantially parallel with the base 10. Also as best shown in these three views, each of the end walls 13 and 14 has the front part 16 of its upper edge portion inclined upwardly from the top edge of the front wall 11 to the front edge of the rear wall top flange 15, and the rear part 17 of its upper edge portion generally straight and underlying or adjacent an end edge of said flange 15. The housing A thus has a full length forwardly and upwardly directed opening 18 of rectangular form, which not only affords access to the interior of the housing but also, constitutes the passageway for the outwardly and upwardly directed ultraviolet radiations emitted by the lamp B, as will hereinafter more fully appear.

For the fabrication of said housing, any suitable methods may be employed. In the housing here shown, the base, front and rear walls (including the forwardly extending top flange 15 of the rear wall) are in one piece, having been simply and economically stamped from sheet metal and bent to shape. The end walls 13 and 14 are separate metal stampings, and for securing them in place, welding is here utilized, the end walls having side tabs 20 (see Fig. 6) for connection to the inner surfaces of the housing front and rear walls, bottom tabs 21 for connection to the inner (or upper) surface of the housing base, and rear top tabs 22 for connection to the inner surface of the top flange 15 of the housing rear wall 12.

To direct upwardly and outwardly, through the housing opening 18, the ultraviolet radiations emanating from the lamp B, a one-piece reflector 24 of trough-shaped cross section is here utilized, said reflector having a length substantially equal to that of said housing opening. As best shown in Fig. 5, said reflector has a bottom portion 25 in generally parallel relation with the housing base 10, an upright and relatively narrow rear portion 26 in contact with the inner surface of the housing rear wall 12, and an upwardly and forwardly inclined rear portion 27 extending to the front edge of the forwardly extending top flange 15 of said housing rear wall and there provided with a rearwardly extending top flange 28 resting on said housing rear wall flange. The reflector also has a forwardly and upwardly inclined front portion 30 extending from its generally flat bottom portion 25 to the top edge of the housing front wall 11 and there provided with a depending flange 31 for contact with the outer or front surface of said housing front wall. The reflector 24 is thus firmly supported, both at its front and at its rear, on the housing A, and provides opposite the housing opening 18 an elongated cavity or channel for the reception of the ultraviolet lamp B.

For the mounting of said lamp, the reflector bottom portion 25 is provided adjacent each of its ends with a suitable aperture through which extends and in which is mounted a lamp socket 33, said socket having secured thereto a plate-like part 34 which is screwed or otherwise suitably attached to said reflector bottom portion. The portions of the sockets 33 lying above the reflector bottom portion 25 are of bifurcated form to receive, in electric contact relationship, the projecting end contact prongs (not here shown) of the lamp B, the connection of said lamp to the sockets 33 being readily and easily effected. The ultraviolet lamp B is thus mounted in the trough or channel of the reflector 24 in generally parallel relationship with its bottom portion 25, and all radiations emitted by such lamp and impinging upon said reflector are directed by said reflector upwardly and outwardly through the housing opening 18, as will be evident from Fig. 9.

Suitably mounted within the housing A, below the reflector 24, is the usual ballast 36 and starter 37 necessary for the operation of the ultraviolet lamp B, said starter being detachably connected in any suitable manner to the ballast. Wiring 38, fragmentarily here shown, electrically connects the ballast and the lamp sockets 33, and wiring 39, also fragmentarily shown, is provided for the connection of the sterilizer to a source of alternating current, the wiring 39 extending from the ballast 36 out through an aperture 40 in the housing end wall 13 and being provided at its free end with a conventional contact plug 41.

Figure 8:
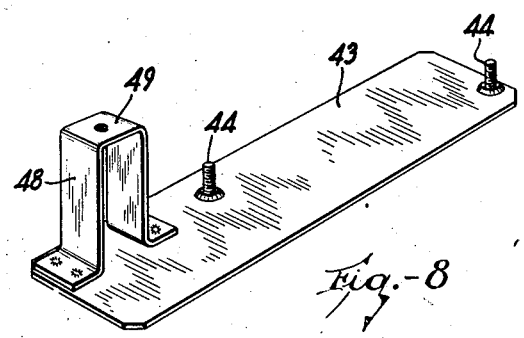
Fig. 8 is a perspective view of a supporting plate of the sterilizer.

For the mounting within the housing A of the ballast 36 and the starter 37 carried thereby, a supporting plate 43 of sheet metal or the like is here utilized, said plate being illustrated per se in Fig. 8. As best shown in such view, this plate is provided with two upright and longitudinally spaced threaded studs 44, and as best shown in Fig. 6, the ballast 36 is provided with apertured end lugs 45 to receive said studs. If desired and as here shown, the studs may be provided with asbestos or like washers 46 on which the ballast lugs rest (see Fig. 6), and nuts 47 are provided for the studs to firmly secure the ballast thereto. As clearly shown in Figs. 5 and 6, the ballast-supporting plate 43 rests upon the housing base 10, being welded or otherwise rigidly secured thereto. In order to enable the starter 37 to project outwardly through an opening in one of the housing end walls (the end wall 14 as here shown), for convenient access thereto, the plate 43, upon which the ballast 36 is mounted, is located adjacent said housing end wall 14. To prevent any interference with the insertion or the removal of the starter, the plate stud 44 adjacent said starter is located to the right of the longitudinal axis of said starter, as viewed in Fig. 5, and the other plate stud is located to the left of such axis to thereby balance the disposition of said studs and the ballast mounted thereon.

To provide additional support for the reflector 24, the ballast-supporting plate 43 has a length somewhat greater than that of the ballast and thus projects inwardly therebeyond toward the housing end wall 13, as shown in Fig. 6. On this projecting end portion of the plate 43 is mounted, by welding or the like, a channel-shaped bracket 48 and to the generally flat top portion 49 of said bracket is suitably secured, such as by the machine screw 50, the bottom portion 25 of the reflector 24. As here shown (see Fig. 6), the bracket 48 is located substantially midway the ends of the reflector 24, so that said reflector is quite firmly supported.

Figure 9:
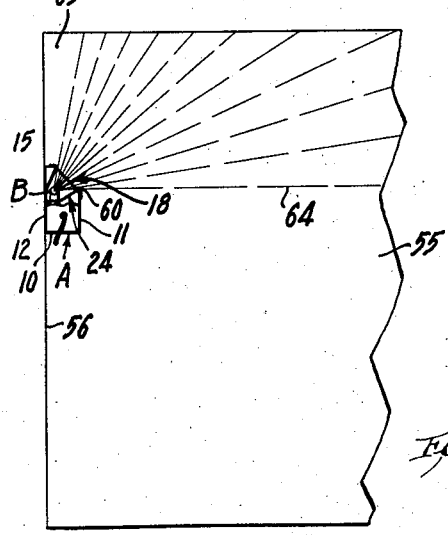
Fig. 9 is a diagrammatic illustration of a room or chamber in which is mounted, on a wall thereof, for effective air sterilization or sanitary ventilation, the aforesaid ultraviolet sterilizer.

Although ultraviolet sterilizers embodying the present invention may be used for various sterilizing purposes, the devices here involved are particularly useful in effecting air sterilization or sanitary ventilation in a room or chamber. For such sterilizing purposes, one or more of the present sterilizers are mounted on the wall or walls of the room or chamber whose air is to be sterilized, at a height above that of any standing occupants of said room or chamber, say at a height of seven feet, for example. In Fig. 9 is diagrammatically illustrated a room or chamber 55 in which is mounted, on the wall 56 thereof, an ultraviolet sterilizer of the foregoing construction. As shown in this view, the ultraviolet radiations emitted by the lamp B pass upwardly and forwardly through the housing opening 18 to the upper regions of said room or chamber.

As best shown in Fig. 5, the ultraviolet lamp B is here located directly above the generally flat reflector bottom portion 25, and the height of the horizontally disposed longitudinal axis of said lamp with respect to the upper front edge 60 of the sterilizer is one of the important features of the present sterilizer. The operating characteristics of an ultraviolet lamp of the type here used are such that the ultraviolet radiations emitted by said lamp originate in a generally cylindrical zone 61 extending between the terminal electrodes of the lamp and indicated in sectional outline in Fig. 5 by the dotted line circle 62. As will be evident from Fig. 5, the longitudinal axis of this generating zone 61 is coincident with the longitudinal axis of the lamp, the diameter of said zone being substantially one-half that of the lamp diameter. The lamp is therefore so located in the trough or channel of the reflector 24 that the front intercepting edge 60 of the sterilizer (the front edge of the reflector 24, as here shown) is not lower than a horizontal plane tangential to the top of the ultraviolet generating zone 61, and in the preferred embodiment of the invention here illustrated, said edge 60 coincides with said horizontal tangential plane.

This relationship of the generating zone 61 of the lamp B with respect to the upper front edge 60 of the sterilizer is of the greatest importance, as it permits the lowest possible location of the sterilizer on a chamber wall, consistent with the shielding of the occupants of said chamber from direct ultraviolet radiations while subjecting the greatest volume of air to the sterilizing effect of the germicidal ultraviolet. In Fig. 9, the sterilizer is mounted at such height on the wall 56 that the lowest direct ray 64 emanating from the lamp B follows a path which does not diverge below the horizontal, and the only portion of the chamber 55 above this level which is not permeated by ultraviolet radiations is the portion 65 which is shielded by the relatively narrow housing top flange 15. As two or more sterilizers of the construction here disclosed may be placed at spaced locations in the chamber 55, every region of the upper part of said chamber may be thoroughly irradiated by the germicidal ultraviolet. Tests recently made indicate that the most efficient method of using bactericidal ultraviolet for air sterilization or sanitary ventilation of a room or chamber is by the direct irradiation of the air in the upper regions of said room or chamber.

Figure 7:
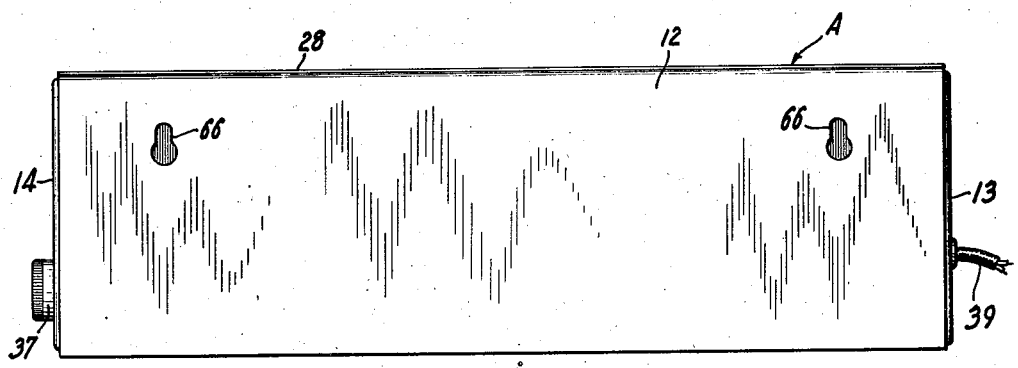
Fig. 7 is a rear elevational view of the sterilizer.

To enable the sterilizer here illustrated to be readily mounted in a horizontal position on a wall or other suitable support, the rear wall 12 of the sterilizer housing A may be provided, as shown in Fig. 7, with suitably spaced apertures 66, the apertures here shown being of the key hole shape frequently used for hanging purposes.

From the foregoing description thereof, it will be evident that the ultraviolet sterilizer here illustrated and described is of simple and inexpensive construction, of neat and pleasing appearance, and of high operating efficiency. The ballast necessary for the operation of the ultraviolet lamp of the sterilizer is completely enclosed and thereby concealed from view, and the germicidal ultraviolet emitted by said lamp are confined, when the sterilizer is horizontally mounted to the region above a plane tangential to the top of the generating zone of said lamp. The reflector of the sterilizer is shaped for efficient direction of the ultraviolet radiations emanating from the lamp, and said reflector is firmly supported. The sterilizer is of compact form and of sturdy design and all parts are capable of being easily and conveniently assembled.

To those skilled in the art to which the present invention relates, other features and advantages of sterilizers embodying the invention will be evident from the foregoing description of one such embodiment.

What I claim is:

1. An ultraviolet sterilizer, comprising an elongated housing having spaced front and rear walls and an elongated opening therebetween, an elongated reflector of trough-shaped cross section carried by said housing and facing upwardly and forwardly toward said housing opening, said reflector having a lower rear portion in planar contact with said housing rear wall and having an upper rear portion extending forwardly from such wall and also having a front portion extending upwardly and forwardly to the housing front wall, a tube type ultraviolet lamp mounted in the trough of said reflector, and lamp operating means mounted within said housing.

2. An ultraviolet sterilizer, comprising an elongated housing having spaced front and rear walls and an elongated opening therebetween, said housing rear wall being provided adjacent its top with a forwardly extending flange, an elongated reflector of trough-shaped cross section carried by said housing and facing upwardly and forwardly toward said housing opening, said reflector having a lower rear portion in planar contact with said housing rear wall and having an upper rear portion extending forwardly from such wall to the front edge of its top flange and also having a front portion extending upwardly and forwardly to the housing front wall, a tube type ultraviolet lamp mounted in the trough of said reflector, and lamp operating means mounted within said housing.

3. An ultraviolet sterilizer, comprising an elongated housing having spaced front and rear walls and an elongated opening therebetween, supporting means in said housing between its front and rear walls, an elongated reflector of trough-shaped cross section in said housing and facing upwardly and forwardly toward said housing opening, said reflector having a rear portion in planar contact with said housing rear wall and having a bottom portion secured to said supporting means and also having a front portion extending upwardly and forwardly to the housing front wall, a tube type ultraviolet lamp mounted in the trough of said reflector, and lamp operating means mounted within said housing.

4. An ultraviolet sterilizer, comprising a housing having an end wall, a plate-like element mounted in said housing, a bracket carried by said plate-like element, an elongated reflector in said housing overlying said plate-like element and said bracket and secured substantially midway its ends to said bracket, said reflector being of trough-shaped cross section and facing upwardly and forwardly, an ultraviolet lamp mounted in the trough of said reflector, a ballast for said lamp carried by said plate-like element between said bracket and said housing end wall, and a starter for said lamp carried by said ballast and projecting to the outside of said housing through said end wall thereof.

ROBERT A. HRABAK.